United States Patent [19]

Mallory

[11] 4,162,911
[45] Jul. 31, 1979

[54] PLURAL GLASS FORMING MACHINES WITH LEHR CONVEYOR

[75] Inventor: James D. Mallory, Maumee, Ohio

[73] Assignee: Owens-Illinois, Inc., Toledo, Ohio

[21] Appl. No.: 815,626

[22] Filed: Jul. 14, 1977

[51] Int. Cl.² .............. C03B 9/00; C03B 19/02; B25J 3/00
[52] U.S. Cl. ......................... 65/229; 65/241; 65/260; 198/490; 414/744
[58] Field of Search ............. 198/490; 214/1 BC; 65/260, 229, 241

[56] References Cited

U.S. PATENT DOCUMENTS

| | | | |
|---|---|---|---|
| 1,745,794 | 2/1930 | Hatch | 65/229 |
| 1,833,623 | 11/1931 | Smith | 65/260 X |
| 2,660,831 | 12/1953 | Rowe | 65/260 |
| 3,216,813 | 11/1965 | Mumford | 65/229 X |
| 3,305,342 | 2/1967 | Hafferkamp | 65/260 |
| 3,650,725 | 3/1972 | Okumura et al. | 65/260 |
| 3,764,284 | 10/1973 | Rowe | 65/260 X |
| 4,002,454 | 1/1977 | Rowe | 65/229 |
| 4,062,668 | 12/1977 | Zappia | 65/229 |
| 4,063,918 | 12/1977 | Zappia | 65/229 |

Primary Examiner—S. Leon Bashore
Assistant Examiner—Frank W. Miga
Attorney, Agent, or Firm—D. T. Innis; M. E. Click; D. H. Wilson

[57] ABSTRACT

Two sections of a multiple section-type of glass forming machine are disclosed in which each section is comprised of a single parison forming station and two blow molding stations with a pair of transfer arms for alternately transferring and reverting the formed parisons from the parison station to the blow molding stations. A take-out means is provided for each blow molding station to move the blown ware to a dead plate. A sweep-out device moves the ware from the cooling dead plate to a conveyor. A common conveyor for all of the forming machine sections is provided for conveying the ware away from the sections which are physically arranged as in-line forming machine sections.

1 Claim, 3 Drawing Figures

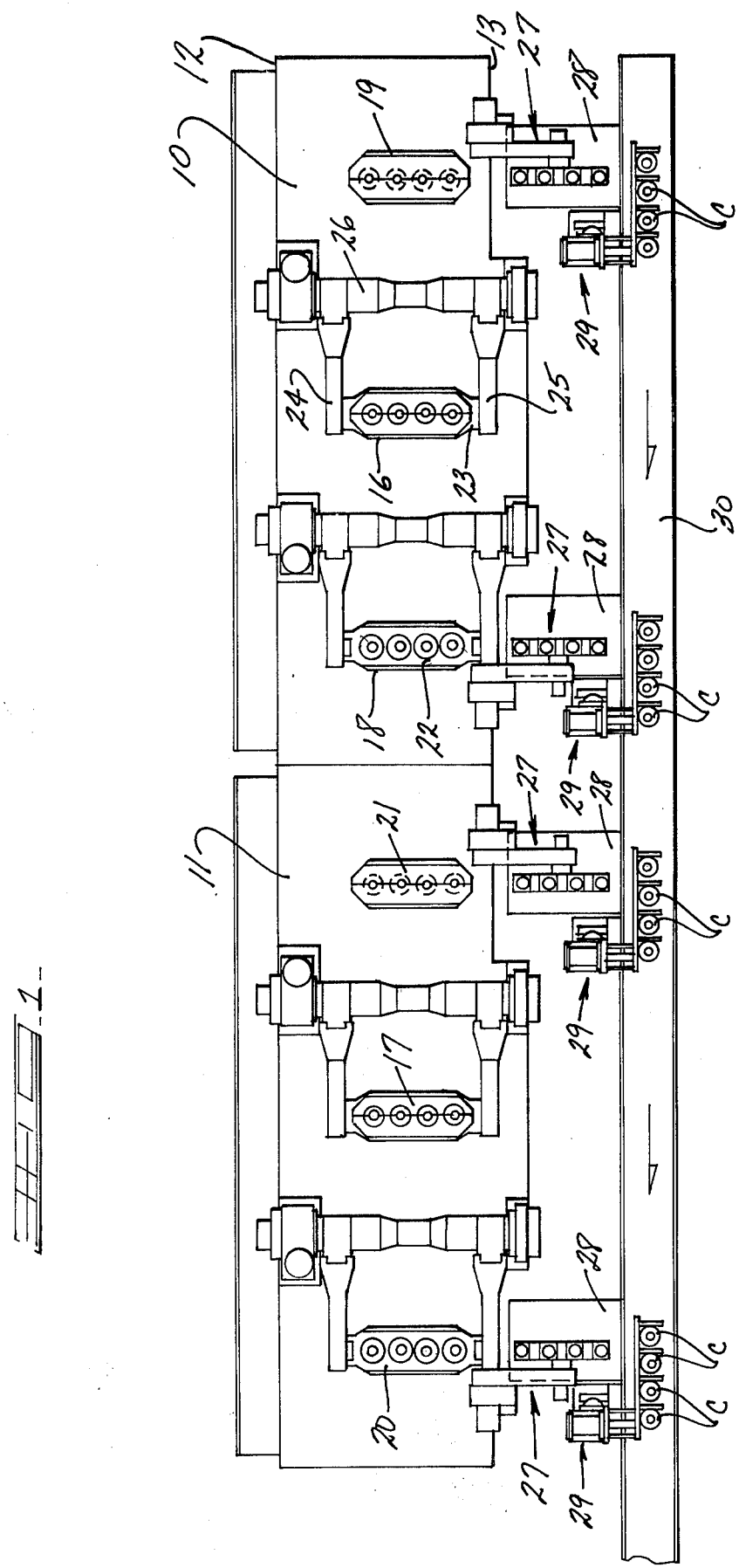

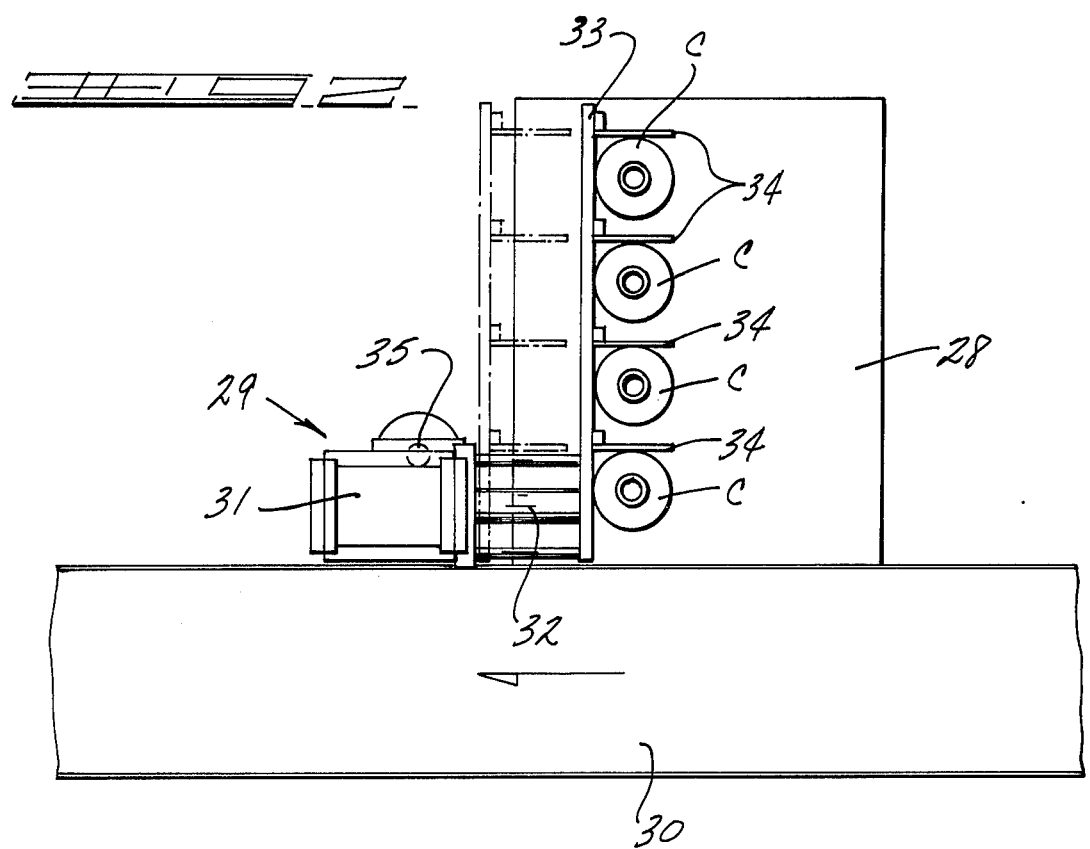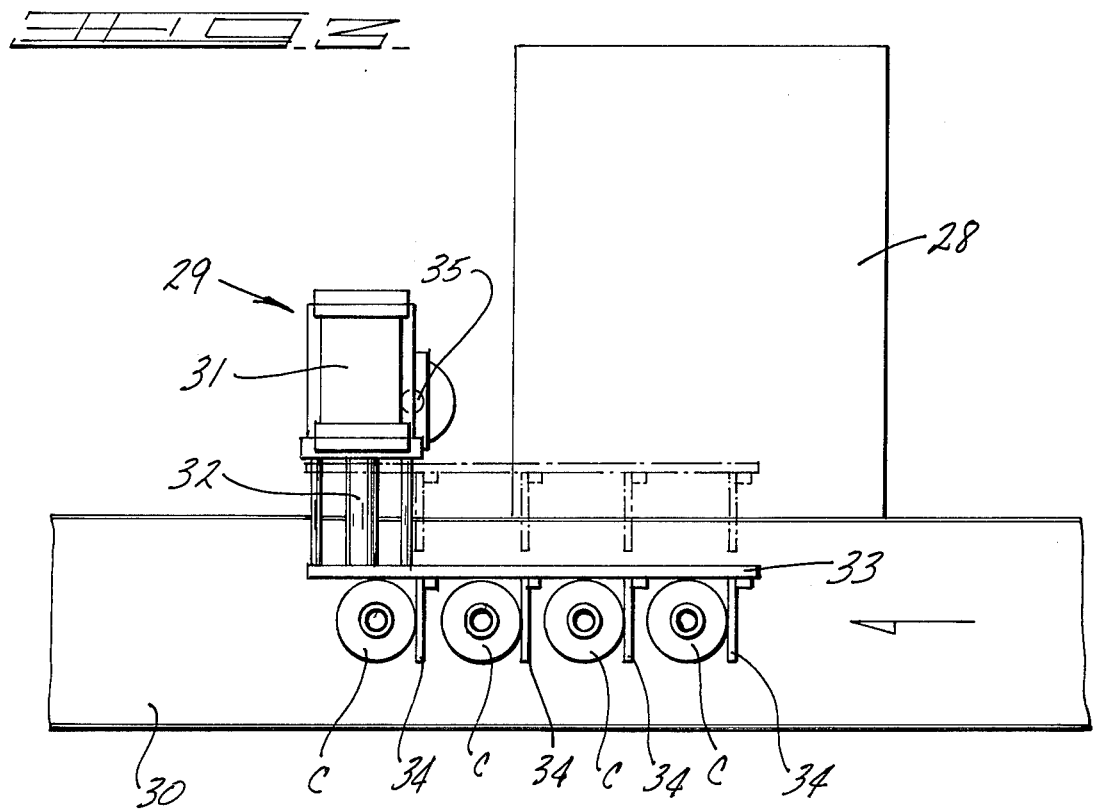

PLURAL GLASS FORMING MACHINES WITH LEHR CONVEYOR

BACKGROUND OF THE INVENTION

This invention relates to the manufacture of blown glass articles such as bottles, jars, flasks, etc. According to the "narrow neck" or "blow and blow" method presently used and as described in U.S. Pat. No. 1,911,119, a charge of glass is delivered to and compacted or caused to settle in the cavity of an inverted or neck-down blank or parison mold, the glass of the charge extending from the neck portion of the mold cavity part of the way up the sides thereof. A baffle plate is placed on the uppermost end of the inverted blank or parison mold and air under pressure is applied to the interior of the glass in the mold to counterblow such glass into conformity with the internal configuration of the blank or parison mold and against the baffle plate. Thereafter, the counterblown blank or parison is transferred to an upright final blow mold in which the blank or parison is disposed in an upright or neck-up position and air under pressure is applied to the interior thereof. The counterblown blank or parison is thus expanded to the configuration of the final blow mold cavity, thereby forming an article of the final shape and size desired.

The previously mentioned U.S. Pat. No. 1,911,119, issued to Ingle, has become the forerunner of the presently successful and commercially important standard "I.S." glass forming machine.

In the prior art processes, exemplified by the referenced Ingle patent, the I.S. forming machines have been lined up in such a manner that the parison molds of each section are all in a common vertical plane and the blow molds in turn are also in a common vertical plane. In this manner the take-out mechanism will remove the bottles from the blow molds to a cooling dead plate position where the bottoms of the bottles set up. A common conveyor will pass beside each of the cooling dead plates and in a predetermined timed relationship, the ware will be pushed from the dead plate onto the conveyor. The conveyor then carries the ware to the position in front of the lehr, the ware normally arriving in front of the lehr on a cross-conveyor with a lehr loaded then used to push a row of containers from the cross-conveyor onto the leading edge of the lehr mat or belt that will carry the ware through the lehr.

DESCRIPTION OF PRIOR ART

An example of a machine conveyor, as it is termed, or glassware conveyor, is depicted in U.S. Pat. No. 1,921,390 issued to H. W. Ingle on Aug. 8, 1933. In this patent, the forming machines having blow molds $F^1$, $F^2$, $F^3$, and $F^4$, as shown in FIGS. 1 and 2 of the patent, have the ware produced in these molds set out on cooling dead plates $18^a$, $18^b$, $18^c$, and $18^d$. The conveyor for carrying the ware away from the forming machines to a cross-conveyor is shown passing by the four dead plates.

Another arrangement of transferring glassware from a plurality of forming machines is disclosed in U.S. Pat. No. 2,867,335 issued to E. H. Mumford on Jan. 6, 1959. In this particular patent, glass forming machines 10 produce containers which are positioned on dead plates 1-6. The transfer arm carries the ware from the dead plates 1-6 to a rotating table 12 which passes by each of the dead plates and the ware is accumulated on the table and from there directed by a diverter arm 55 to an outgoing conveyor 56.

Another array of forming machines is disclosed in U.S. Pat. No. 3,147,102 issued to U. P. Trudeau on Sept. 1, 1964. This particular patent shows four individual forming machine sections which transfer the ware from the sections onto a pair of conveyors 20 which carry the ware away from the machines. This array of machines is in a generally square pattern.

Another patent of some interest is U.S. Pat. No. 3,595,365 issued to A. W. Faure on July 27, 1971. This particular patent is the latest of a large group of patents directed to a sweepout mechanism. The particular patent shows a right angle or 90° sweepout device for moving the ware B from the dead plate 62 onto a moving conveyor 60. This particular patent goes specifically to the details of the mechanism for driving the sweepout and is an example of a style of sweepout which is to be used on the present apparatus.

Another U.S. Pat. No. 3,216,813 issued to E. H. Mumford on Nov. 9, 1965 discloses a glass forming machine in which a single, plural-cavitied parison mold supplies parisons to two plural-cavitied blow molds. The patent is entirely silent with respect to how more than one of these machines might be used in conjuncion with another.

SUMMARY OF THE INVENTION

An array of glass container forming machine sections of the parison forming and blow molding type in which a single parison mold provides parisons to two blow molds. The parison forming position is intermediate the two blow molding positions and this arrangement comprises a single section. Additional sections, of the same configuration, are intended to be fed by a common gob feeder and each section is provided with take-out means to transfer formed bottles from blow molds to individual dead plates for each blow mold and a conveyor is provided to carry the ware from in front of the dead plates to a later processing apparatus such as a lehr.

BRIEF DESCRIPTION OF THE DRAWINGS

FIG. 1 is a plan view of the array of forming machine sections of the invention;

FIG. 2 is an enlarged plan view of the relationship of the sweepout mechanism for one of the forming sections relative to the conveyor; and FIG. 3 is a view similar to FIG. 2 showing the sweepout turned through to 90° to move the ware onto the conveyor.

DETAILED DESCRIPTION OF THE DRAWINGS

With particular reference to the drawings, a general discussion of the invention and the embodiment of the invention will be described. Reference may be had to applicant's co-pending application Ser. No. 775,132, filed Mar. 7, 1977, in which the details of the single section forming machine are disclosed. The forming machines of the invention comprise generally horizontal tables 10 and 11 which are supported at an elevated location above a base by sidewalls 12 and 13 which support the molds and parison transfer mechanisms.

As set forth in the above-referred-to application, table 10 constitutes a machine section in which a single parison mold 16, associated with the table 10, with plural cavities defining a vertical plane that bisects the center of the machine sections. The parison molds shown have four cavities. Each of the sections defined by the tables 10 and 11 is provided with a pair of blow molds 18 and 19. The blow molds 18 and 19 are supplied with parisons by the parison mold 16 and a pair of blow molds 20 and 21 are associated with the parison mold 17. The blow molds 20 and 21 are equally spaced on opposite sides of the parison mold 17 as are the blow molds 18 and 19 relative to parison mold 16. It should also be noted that adjacent blow molds 18 and 21 are spaced apart the same distance as the spacing between the parison mold and the blow mold.

The parisons formed in the parison molds 16 and 17 are supported in inverted position by either neck mold mechanism 22 or 23, depending upon which is located at the parison mold position. It should be understood that the neck mold 23, as shown in FIG. 1, is positioned beneath the closed, split parison mold 16. Upon complete formation of parisons in the parison mold 16, the molds will open along their centerline permitting the transfer of the neck molds 23 by arms 24 and 25 about a horizontal axis 26 to thereby invert and transfer the parisons to the blow mold 19 where they will be expanded into complete bottle shape or form. After the parisons are expanded to bottle form, the blow molds will open and the bottles will be picked up by their necks by a take-out mechanism 27 that will deposit the bottles on a cooling dead plate 28. Bottles on the cooling dead plate 28 are then swept by a 90° sweepout mechanism 29 from the dead plate 28 to a moving conveyor surface 30 moving in the direction of the arrow shown thereon.

In actual practice, the dead plates 28 will have perforations through the upper surface thereof through which cooling air exits to impinge on the blown containers C.

As can best be seen in FIGS. 2 and 3, the sweepout mechanism 29 is comprised of a fluid motor 31 having an output piston rod 32, to the extending end of which is mounted a pusher member 33. The pusher member 33 carries a plurality of outstanding divider fingers 34 which, in cooperation with the pusher 33, keep the plural containers C separated from each other during the sweeping movement from the dead plates 28 to the conveyor 30. The motor 31 extends and retracts the pusher 33 from the full line to the dotted line position shown in FIGS. 2 and 3.

As can be seen, the ware is positioned by the take-out mechanism 27 on the dead plates 28 in the position shown in FIG. 2. At this time, the pusher bar 33 is in its retracted or dotted line position and upon actuation of the motor 31 will move to the right to the position shown in full line. Once the pusher is in this position, the motor is rotated about the central vertical axis defined by a shaft 35 to the position shown in FIG. 3 at which time the motor 31 will be actuated to retract or withdraw the fingers 34 back to the dotted line position. With the fingers retracted, the motor 31 is returned to the position shown in FIG. 2. In this way the finished containers are swept out onto the conveyor.

As shown in FIG. 1, the containers C and the sweepout mechanisms 27 are all shown in the full line position of having just swept the containers from the dead plate onto the conveyor 30. However, it should be understood that this is a situation which is not normal. Obviously, the containers are being made, as previously indicated, from glass issuing from a single source. Thus the plural gobs of glass which will ultimately be used to form the finished containers will be fed to the parison molds in a preselected sequence. Only two sets of parison molds are shown, namely, parison molds 16 and 17. However, additional forming sections may be placed in the same orientation as the two sections shown such that a third or perhaps even a fourth parison mold would be present beneath a gob feeder. The feeder is normally at the terminus of a forehearth channel containing molten glass. The feeder may feed as many as four gobs at a time to the parison molds. The only limitations in the number of sections would be in the capacity of the feeder and forehearth to feed glass to these sections. It should also be understood that each parison mold assembly will be providing a pair of blow mold assemblies, positioned on opposite sides thereof, with parisons, so that a single parison mold unit supplies a pair of blow mold units. The ware that is produced in the blow molds will be taken out in a sequence which will be the same as the sequence of delivery of the glass to the parison molds in view of the fact that all operations must continue in a definite time interval from gob feed to take-out and sweepout. The actual sweeping of the containers from the dead plates to the conveyor will be such as to provide a relatively full conveyor of ware to a lateral cross-conveyor that passes in front of the inlet end of a lehr. The ware is pushed from the cross-conveyor into the lehr to be supported by the lehr mat and to thereby be conveyed through the lehr and annealed in the usual manner.

While the foregoing description has principally dealt with the relationship of two sections of glass forming machines, it should be apparent that additional identical sections could be utilized by placing them in the same relationship to each other and to the two disclosed sections to form a series of forming sections all commonly supplying formed ware to the machine conveyor.

I claim:

1. An array of a plurality of glass container forming machine sections in which each forming machine section comprises a split parison molding unit, a split blow molding unit, said parison molding unit having a plurality of mold cavities therein, said blow molding unit having a plurality of mold cavities therein and being laterally displaced from said parison molding unit, the axes of the parison cavities being in spaced aligned relation and lying in a first plane, the axes of the blow mold cavities being in similarly spaced aligned relation and lying in a second plane parallel to said first plane, means for simultaneously transferring parisons from the parison forming unit to the blow molding unit, said transfer means being pivotally mounted on said apparatus about an axis disposed in right angular relation to an in a plane parallel to the axes of said cavities, a second blow molding unit having a plurality of mold cavities having their axes in spaced aligned relation similarly to that of said parison cavities and lying in a third plane parallel to said first plane on that side of said parison mold opposite said first mentioned blow molding unit, and a second transfer means pivotally mounted about an axis disposed in right angular relation to and in a plane parallel to the axes of said parison cavities, said parisons being moved through parallel arcs from inverted position at the parison forming station to an upright position at the blow molding stations whereby said parisons are subjected to the same centrifugal and gravitational forces during transfer; the improvement comprising one plural cavity container forming machine in juxtaposition to another such that the adjacent plural cavity blow molding units of the separate sections are in planes that are parallel to each other and to the pivot axis of the parison transfer means and the spacing between all of the molding units, both parison molding units and blow molding units are equal, a machine conveyor extending past the array of forming machines with its longitudinal axis being normal to the planes of the split lines of all the molding units in the array of machines.

* * * * *